(12) United States Patent
Ding et al.

(10) Patent No.: US 11,391,642 B2
(45) Date of Patent: Jul. 19, 2022

(54) PORTABLE PNEUMATIC LOADING SYSTEM FOR SIMULATING OPERATION OF SUBWAY TRAIN

(71) Applicant: ZHEJIANG UNIVERSITY CITY COLLEGE, Hangzhou (CN)

(72) Inventors: Zhi Ding, Hangzhou (CN); Yu Jiang, Hangzhou (CN); Qianqian Lu, Hangzhou (CN); Cheng Chen, Hangzhou (CN); Yuanji Shao, Hangzhou (CN); Yinrui Zhang, Hangzhou (CN); Hongbing Zhu, Hangzhou (CN); Xiao Zhang, Hangzhou (CN)

(73) Assignee: ZHEJIANG UNIVERSITY CITY COLLEGE, Hangzhou (CN)

( * ) Notice: Subject to any disclaimer, the term of this patent is extended or adjusted under 35 U.S.C. 154(b) by 282 days.

(21) Appl. No.: 16/717,740

(22) Filed: Dec. 17, 2019

(65) Prior Publication Data

US 2020/0292412 A1    Sep. 17, 2020

(30) Foreign Application Priority Data

Mar. 13, 2019    (CN) .......................... 201910187168.0

(51) Int. Cl.
*G01M 7/02*    (2006.01)
*B61L 23/04*    (2006.01)

(52) U.S. Cl.
CPC ............. *G01M 7/022* (2013.01); *B61L 23/04* (2013.01)

(58) Field of Classification Search
CPC ...... G01M 7/022; G01M 5/0058; G01M 7/00; B61L 23/04; B61L 27/0055; E01B 19/00; E01B 35/12
See application file for complete search history.

(56) References Cited

U.S. PATENT DOCUMENTS

| 2015/0316458 | A1* | 11/2015 | Logan | ................. G01M 5/0058 73/846 |
| 2017/0197646 | A1* | 7/2017 | Shubs, Jr. | ........... B61L 27/0077 |
| 2019/0078967 | A1* | 3/2019 | Fritsch | ................ G01M 5/0058 |

* cited by examiner

*Primary Examiner* — Suman K Nath
(74) *Attorney, Agent, or Firm* — Jiwen Chen; Jacobson Holman PLLC

(57) ABSTRACT

A portable pneumatic loading system for simulating the operation of a subway train is provided, comprising a control cabinet, an powered air station and an air cylinder, wherein a proportional directional valve is disposed between the control cabinet and the powered air station, a control cabinet is connected to the powered air station through an air inlet pipe, and the powered air station is connected to the air cylinder through a hose; a PLC, a switching power supply and a guide rail are arranged in the control cabinet, with the PLC and the switching power supply being connected through signal lines to a wiring terminal fixed on the guide rail; a frequency regulating knob, an emergency stop switch, a main start button, a power start button and a power indicator are embedded in five through holes formed on a door of the control cabinet, respectively; a signal line led out from the top of the control cabinet is connected to the proportional directional valve; and, the air cylinder is connected to the proportional directional valve through a hose. The present invention has the following advantages: the system is light, flexible and portable, and can enter subway tunnels under various working conditions; and, the design is novel and reasonable, the operation is simple, the actual engineering operation is highly feasible, and the on-site adjustment process is more visible.

6 Claims, 3 Drawing Sheets ered air station is connected to the air
PORTABLE PNEUMATIC LOADING SYSTEM FOR SIMULATING OPERATION OF SUBWAY TRAIN This application claims the priority benefit of Chinese Application No. 201910187168.0, filed Mar. 13, 2019 in Chinese, under 35 U.S.C. § 119, which is hereby incorporated by reference.

TECHNICAL FIELD OF THE INVENTION

The present invention relates to the technical field of pneumatic vibration loading systems, and in particular to a portable pneumatic loading system for simulating the operation of a subway train.

BACKGROUND OF THE INVENTION

To deal with the increasingly prominent traffic jam problem, urban rail transit has been highly appraised as an efficient solution, greatly facilitating residents' life. As one of important facilities for modern urban traffic, the rail transit plays an important role in relieving the traffic pressure on the ground and realizing the sustainable development of urban economy and society, and has become a hotspot for local government investment. Newly-built subway lines in many cities in China will be opened soon. But, how to ensure the successful trail operation of new lines has become an important topic discussed by subway companies.

With the operation of many subway tunnels, it is found that the environmental vibration and noise caused by subway traffic will influence the daily work, life and rest of residents, result in the structural damage or construction damage to buildings, interfere with the normal use of special functional buildings such as hospitals, opera houses and laboratories, and influence the normal operation of precise instruments and devices. Therefore, the problems caused by the vibration of subway trains have attracted more and more attention. Researches on the influence of the vibration of subways on rails, foundations, tunnel walls and surface buildings during the trail operation and normal operation of the subways have been widely carried out.

At present, for most of the experimental devices for such researches, simulation is carried out by automatic drop hammer experiments or experiments are carried out during the actual operation of the subways. It is difficult to determine the magnitude and frequency of the impact force and such a method is not simple enough.

Therefore, there is an urgent need for a set of impact loading devices that can output a definite impact force and can adjust the magnitude and frequency of the impact force to simulate the real vibration characteristics of the subway, thereby providing a new means for subway vibration tests and researches, especially for on-site train vibration monitoring and indoor test and research simulation.

SUMMARY OF THE INVENTION

An object of the present invention is to provide a portable pneumatic loading system for simulating the operation of a subway train, which simulates real vibration characteristics of subways and can output the magnitude and frequency of the impact force.

For this purpose, the present invention employs the following technical solutions.

A portable pneumatic loading system for simulating the operation of a subway train is provided, comprising a control cabinet, a powered air station and an air cylinder, wherein a proportional directional valve is disposed between the control cabinet and the powered air station, the control cabinet is connected to the powered air station through an air inlet pipe, and the powered air station is connected to the air cylinder through a hose;

a PLC (programmable logic controller), a switching power supply and a guide rail are arranged in the control cabinet; the PLC and the switching power supply are connected through signal lines to a wiring terminal fixed on the guide rail; a door switch is arranged on the control cabinet, five through holes are formed on a door of the control cabinet, and a frequency regulating knob, an emergency stop switch, a main start button, a power start button and a power indicator are embedded in the through holes, respectively; the frequency regulating knob, the emergency stop switch, the main start button and the power start button are connected to the PLC through signal lines, respectively; the power indicator is connected to the switching power supply through a signal line; and a signal line led out from the top of the control cabinet is connected to the proportional directional valve; and the air cylinder is connected to the proportional directional valve through a hose; the air cylinder is fixed on air cylinder fasteners through bolts and connected to air cylinder brackets through angle iron; the air cylinder brackets are connected to each other through angle iron; and, lower ends of the air cylinder brackets are detachably connected to subway rails through steel rail fasteners.

Further, a flow regulating valve is arranged on the air inlet pipe.

Further, a pressure sensor is connected to an air inlet of the air cylinder through a three-way connector.

Further, the PLC, the switching power supply and the guide rail are fixed on an inner wall of the control cabinet, respectively, and the wiring terminal is buckled on the guide rail through a buckle.

Further, the proportional directional valve is connected to an upper lid of the control cabinet through a directional valve fastener.

Control of the output frequency: by controlling the setting of a timer inside the PLC, a reversing frequency of a pneumatic reversing valve, i.e., a time interval of movement of the air cylinder, is controlled so as to control the output frequency of the air cylinder. The timer is set as one impact every 2.5 S. That is, all requirements for the impact frequency can be satisfied by changing parameters.

Compared with the prior art, the present invention has the following advantages.

In the portable pneumatic loading system for simulating the operation of a subway train provided by the present invention, the device is light, flexible and portable, and can enter subway tunnels under various working conditions; the design is novel and reasonable, the operation is simple, and the actual engineering operation is highly feasible; the impact force and impact speed that are adjustable in magnitude and frequency can be output, the actual operation process is more rigorous, and the on-site adjustment process is more visible; and, the vibration conditions during the subway operation are simulated on site and in laboratories in a more reliable way, which provides more convenient conditions for vibration signal detection and subsequent researches.

Compared with a hydraulic system, the pneumatic system of the present invention uses air as a power source, so the energy source is readily available and inexhaustible, the cost for purchase, storage and transportation of media is saved, and the energy source is clean, safe and pollution-free. The combination of the control cabinet with the impact part of the air cylinder makes the disassembly and assembly easy, and the whole device is light and portable and suitable for various working conditions. With the use of the pneumatic system as a power part, the pressure loss is low, the system responds rapidly and acts quickly, the maintenance is simple, and it is less likely to block the system pipelines. The pneumatic system has good adaptability to the working environment, and has higher safety and reliability than the hydraulic system particularly when it operates in harsh underground working environments such as dusty and vibratory environments.

DETAILED DESCRIPTION OF THE INVENTION

The embodiments of the present invention will be further described below in detail with reference to the accompanying drawings.

Figure 1:
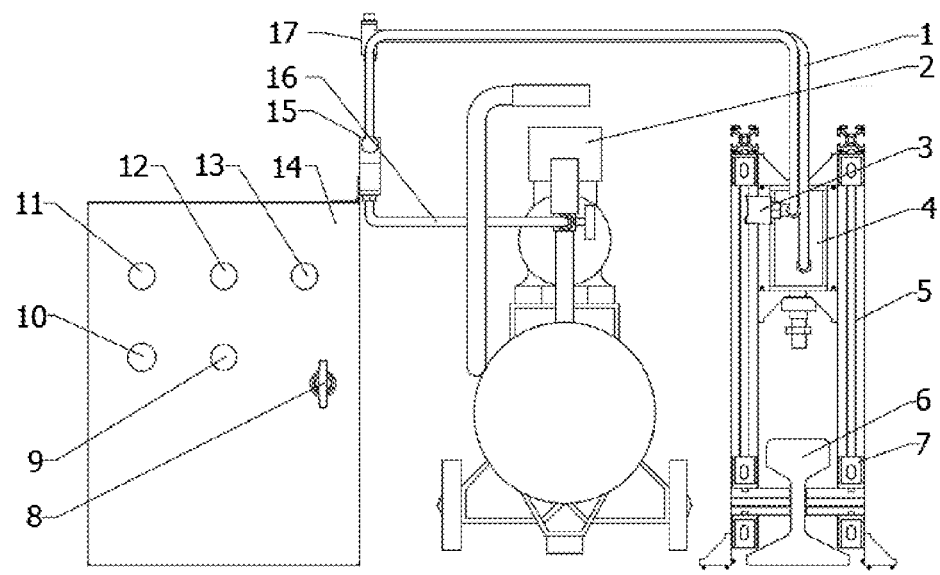
FIG. 1 is a schematic structure diagram of the control cabinet of the portable pneumatic loading system for simulating the operation of a subway train, when the door of the control cabinet is closed, according to the present invention.
Figure 2:
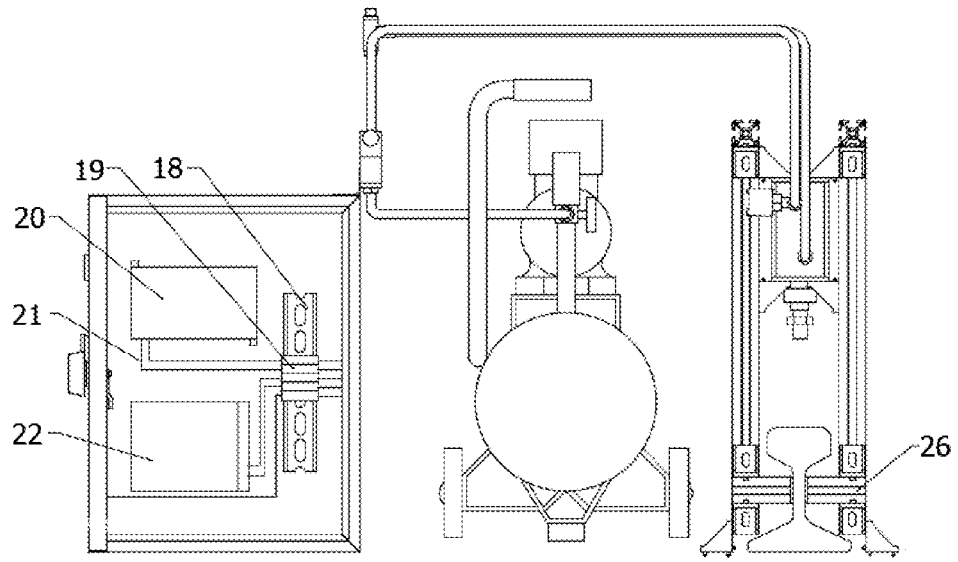
FIG. 2 is a schematic structure diagram of the control cabinet of the portable pneumatic loading system for simulating the operation of a subway train, when the door of the control cabinet is opened, according to the present invention.
Figure 3:
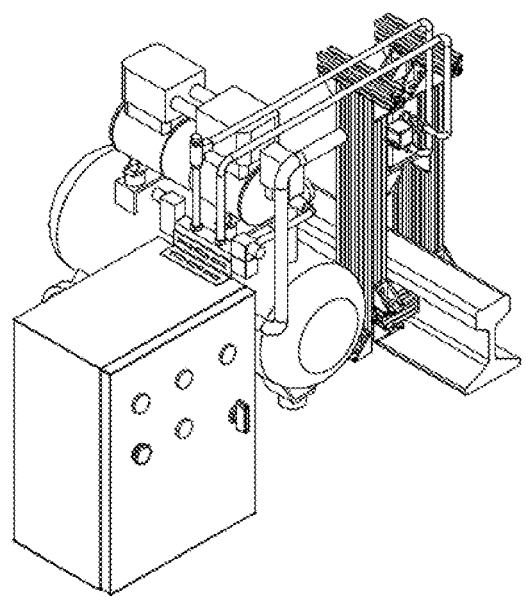
FIG. 3 is a three-dimensional structure diagram of the portable pneumatic loading system for simulating the operation of a subway train according to the present invention.

As shown in FIGS. 1 and 3, a portable pneumatic loading system for simulating the operation of a subway train is provided, including a control cabinet 14, a powered air station 2 and an air cylinder 4. A proportional directional valve 15 is disposed between the control cabinet 14 and the powered air station 2, and the control cabinet 14 is connected to the powered air station 2 through an air inlet pipe 16. The powered air station 2 is connected to the air cylinder 4 through a hose 1. A flow regulating valve 17 is arranged on the air inlet pipe 16.

As shown in FIGS. 1, 2, 3 and 5, a PLC 20, a switching power supply 22 and a guide rail 18 are arranged in the control cabinet 14. The PLC 20 and the switching power supply 22 are connected through signal lines 21 to a wiring terminal 19 fixed on the guide rail 18, respectively. The PLC 20, the switching power supply 22 and the guide rail 18 are fixed on an inner wall of the control cabinet 14, respectively. The wiring terminal 19 is buckled on the guide rail 18 through a buckle. The control cabinet 14 is a single-door control cabinet that can be locked, and a door switch 8 is arranged on the control cabinet 14. By turning the door switch 8, the door can be locked to protect the PLC 20 and the control circuit in the control cabinet 14. Five through holes are formed on the door, and a frequency regulating knob 9, an emergency stop switch 10, a main start button 11, a power start button 12 and a power indicator 13 are embedded in the through holes, respectively. The frequency regulating knob 9, the emergency stop switch 10, the main start button 11 and the power start button 12 are connected to the PLC 20 through signal lines 21, respectively. The power indicator 13 is connected to the switching power supply 22 through a signal line 21. The switching power supply 22 supplies power to the frequency regulating knob 9, the emergency stop switch 10, the main start button 11, the power start button 12 and the PLC 20. The signal line led out from the top of the control cabinet 14 is connected to the proportional directional valve 15, and the proportional directional valve 15 is connected to an upper lid of the control cabinet 14 through a directional valve fastener 23. The system is controlled by the PLC 20 to send an electric control signal to the proportional directional valve 15, the control signal acts on a proportional electromagnet of the proportional directional valve 15, and an electrically-driven valve core of the proportional electromagnet is moved to open the port of the proportional directional valve so as to control the magnitude and direction of the flow passing through the proportional directional valve 15.

The proportional directional valve 15 is disposed between the control cabinet 14 and the powered air station 2, and the control cabinet 14 is connected to the powered air station 2 through the air inlet pipe 16. The flow regulating valve 17 used for controlling or limiting the pressure of air passing through the main air pipe is arranged on the air inlet pipe 16.

Figure 4:
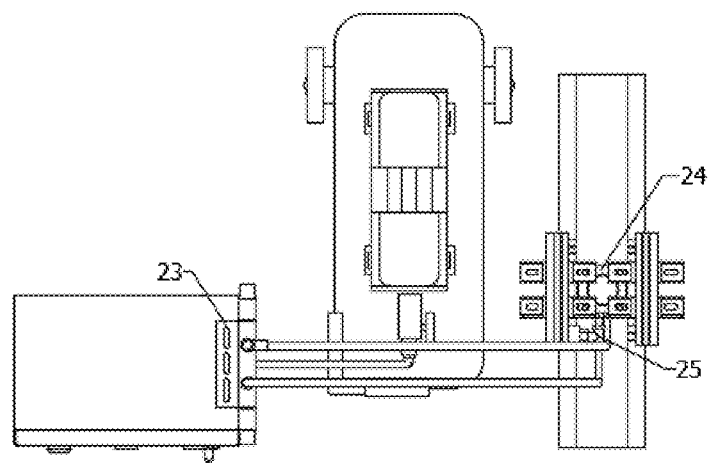
FIG. 4 is a schematic structure diagram of the portable pneumatic loading system for simulating the operation of a subway train, when viewed from the top, according to the present invention.
Figure 5:
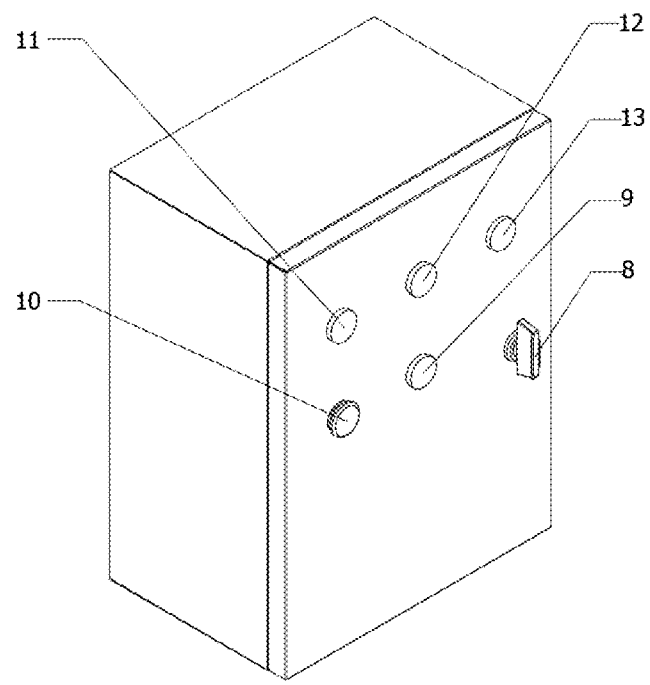
FIG. 5 is a schematic structure diagram of the control cabinet of the portable pneumatic loading system for simulating the operation of a subway train according to the present invention.
Figure 6:
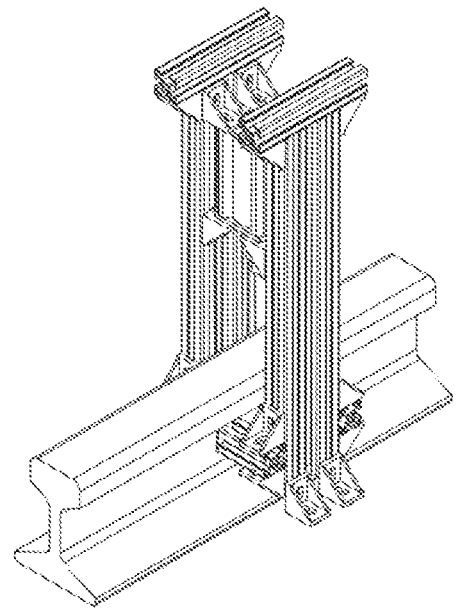
FIG. 6 is a schematic structure diagram of the air cylinder and the air cylinder brackets of the portable pneumatic loading system for simulating the operation of a subway train according to the present invention.

As shown in FIGS. 1 and 4, the air cylinder 4 is connected to the proportional directional valve 15 through a hose 1. Two air ports are formed on the air cylinder 4. One air port on the air cylinder 4 is connected to an air port on the proportional directional valve 15 through a hose 1, and the other air port on the air cylinder 4 is connected to the other air port on the proportional directional valve 15 through a hose 1. As shown in FIG. 6, the air cylinder 4 is fixed on air cylinder fasteners 24 through bolts and connected to air cylinder brackets 5 through angle iron 7. To ensure the stability of the whole mechanical structure, the air cylinder brackets 5 are connected to each other through angle iron 7. The air cylinder fasteners 24 are arranged at upper ends of the air cylinder brackets 5 and the upper end of the air cylinder 4 is fixed by the air cylinder fasteners 24. Lower ends of the air cylinder brackets 5 are detachably connected to subway rails through steel rail fasteners 26, and the steel rail fasteners 26 clamp the rails through bolts. A pressure sensor 3 is connected at an air inlet of the air cylinder 4 through a three-way connector 25. The pressure sensor 2 senses the real-time pressure value of the air cylinder 4. The force acting on the subway rails is equal to the real-time pressure value multiplied by the piston area of the air cylinder. The pressure sensor 3 is connected to a pressure display which can display the real-time pressure value of the air cylinder 4.

Control of the output frequency: by controlling the setting of a timer inside the PLC, a reversing frequency of a pneumatic reversing valve, i.e., a time interval of movement of the air cylinder, is controlled so as to control the output frequency of the air cylinder. The timer is set as one impact every 2.5 S. That is, all requirements for the impact frequency can be satisfied by changing parameters.

By using the portable pneumatic loading system for simulating the operation of a subway train, the loading test is implemented by the following steps.

Step S1): The air cylinder 4, the air cylinder brackets 5 and other devices are mounted on a subway rail to be tested, and the subway rail is clamped and fixed by steel rail fasteners 26.

Step S2): The control cabinet 14 is connected to the powered air station 2 through the proportional directional valve 15 and the air inlet pipe 16, and the air cylinder 4 is connected to the powered air station 2 through the hose 1. The control cabinet 14 is powered on, the regulating knob on the flow regulating valve 17 is rotated counterclockwise until it cannot be rotated any more, and the powered air station 2 is activated to ensure the normal operation of the powered air station.

Step S3): Upper and lower pressure limits of the powered air station 2 during this impact are set according to specific test requirements, that is, the rated operating pressure of the system is set.

Step S4): The main start button 11 on the control cabinet 14 is pressed down; if the power indicator 13 lights, it is indicated that the control circuit is normal; then, the power start button 12 is pressed down, and the proportional directional valve 15 begins to operate at the initial set frequency; and, the impact speed of the system is changed by changing the size of the opening of the flow regulating valve 17.

Step S5): The loading experiment is actually simulated, the power supply is turned on, the powered air station 2 is activated, and the control signal of the proportional directional valve 15 is set by the control cabinet 114. The control signal may be set according to different vibration modes, and the control signal may be sine wave, square wave and the like. The frequency may be controlled by the frequency regulating knob to realize variable frequency control.

Step S6): At the end of the simulation experiment, the control signal is stopped, and the regulating knob is rotated to close and cut off the control signal.

Step S7): The powered air station 2 is deactivated, the power supply is turned off, and the power supply to the whole control cabinet 14 is finally cut off.

Step 8): The fixation bolts are unscrewed, the steel rail fasteners 26 are detached, the fixed air cylinder 4 is disassembled from the subway rails, the experimental site is cleaned, and the experimental devices are placed properly. So far, the experiment ends.

The foregoing description merely shows the preferred implementations of the present invention. It should be noted that, to a person of ordinary skill in the art, various improvements and modifications may be made without departing from the concept of the present invention, and these improvements and modifications shall be deemed as falling into the protection scope of the present invention.

The invention claimed is:

1. A portable pneumatic loading system for simulating the operation of a subway train, comprising a control cabinet, a powered air station and an air cylinder, wherein a proportional directional valve is disposed between the control cabinet and the powered air station, the control cabinet is connected to the powered air station through an air inlet pipe, and the powered air station is connected to the air cylinder through a hose;

a programmable logic controller (PLC), a switching power supply and a guide rail are arranged in the control cabinet; the PLC and the switching power supply are connected through signal lines to a wiring terminal fixed on the guide rail; a door switch is arranged on the control cabinet, five through holes are formed on a door of the control cabinet, and a frequency regulating knob, an emergency stop switch, a main start button, a power start button and a power indicator are embedded in the through holes, respectively; the frequency regulating knob, the emergency stop switch, the main start button and the power start button are connected to the PLC through signal lines, respectively; the power indicator is connected to the switching power supply through a signal line; and a signal line led out from the top of the control cabinet is connected to the proportional directional valve; and the air cylinder is connected to the proportional directional valve through a hose; the air cylinder is fixed on air cylinder fasteners through bolts and connected to air cylinder brackets through angle iron; the air cylinder brackets are connected to each other through angle iron; and, lower ends of the air cylinder brackets are detachably connected to subway rails through steel rail fasteners;

wherein control signal of the proportional directional valve is set by the control cabinet according to different vibration modes simulating the operation of the subway train.

2. The portable pneumatic loading system for simulating the operation of a subway train according to claim 1, wherein a flow regulating valve is arranged on the air inlet pipe.

3. The portable pneumatic loading system for simulating the operation of a subway train according to claim 1, wherein a pressure sensor is connected to an air inlet of the air cylinder through a three-way connector.

4. The portable pneumatic loading system for simulating the operation of a subway train according to claim 1, wherein the PLC, the switching power supply and the guide rail are fixed on an inner wall of the control cabinet, respectively, and the wiring terminal is buckled on the guide rail through a buckle.

5. The portable pneumatic loading system for simulating the operation of a subway train according to claim 1, wherein the proportional directional valve is connected to an upper lid of the control cabinet through a directional valve fastener.

6. The portable pneumatic loading system for simulating the operation of a subway train according to claim 1, wherein, by controlling the setting of a timer inside the PLC, a reversing frequency of a pneumatic reversing valve, i.e., a time interval of movement of the air cylinder, is controlled so as to control the output frequency of the air cylinder.

* * * * *